United States Patent
Bak et al.

(10) Patent No.: US 9,679,399 B2
(45) Date of Patent: *Jun. 13, 2017

(54) METHOD TO OPTIMIZE THE VISUALIZATION OF A MAP'S PROJECTION BASED ON DATA AND TASKS

(71) Applicant: International Business Machines Corporation, Armonk, NY (US)

(72) Inventors: Peter Bak, Yokneam Ilit (IL); Gilad M. Saadoun, Haifa (IL); Harold J. Ship, Galil Tachton (IL); Craig A. Statchuk, Ontario (CA); Avi Yaeli, Ramot Menashe (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/232,891

(22) Filed: Aug. 10, 2016

(65) Prior Publication Data
US 2016/0350970 A1    Dec. 1, 2016

Related U.S. Application Data

(63) Continuation of application No. 14/924,751, filed on Oct. 28, 2015, which is a continuation of application
(Continued)

(51) Int. Cl.
*G06T 11/20* (2006.01)
*G06K 9/00* (2006.01)
(Continued)

(52) U.S. Cl.
CPC .......... *G06T 11/20* (2013.01); *G06F 17/3053* (2013.01); *G06K 9/00476* (2013.01);
(Continued)

(58) Field of Classification Search
USPC ......................................................... 345/427
See application file for complete search history.

(56) References Cited

U.S. PATENT DOCUMENTS

| 5,798,923 A | 8/1998 | Laskowski |
| 6,573,842 B2 | 6/2003 | Mochizuki et al. |
| | (Continued) | |

FOREIGN PATENT DOCUMENTS

WO    2012028164 A2    3/2012

OTHER PUBLICATIONS

IBM: List of IBM Patents or Patent Applications Treated as Related (Appendix P), Aug. 10, 2016, pp. 1-2.
(Continued)

*Primary Examiner* — Kimbinh T Nguyen
(74) *Attorney, Agent, or Firm* — Michael A. Petrocelli

(57) ABSTRACT

A method and system for generating a map using a computer is based on data and weighted factors to minimize corresponding projection distortions. The method and system includes determining visualization goals from analyzing a set of datasets for a map using the computer. A set of visualization characteristics are calculated for each dataset based on the visualization goals using the computer. The visualization characteristics are analyzed to weight factors for each of the datasets. Each of the weighted factors is adjusted based on the relevance of each of the datasets for visualization of the map. An aggregate vector of weighted factors is calculated based on all of the datasets, and the map for visualization is generated based on the aggregate vector of weighted factors.

10 Claims, 6 Drawing Sheets

Related U.S. Application Data

No. 14/590,061, filed on Jan. 6, 2015, now Pat. No. 9,536,328.

(51) Int. Cl.
- *G06T 5/00* (2006.01)
- *G06K 9/62* (2006.01)
- *G06K 9/52* (2006.01)
- *G06F 17/30* (2006.01)
- *G06T 17/05* (2011.01)
- *G09B 29/00* (2006.01)
- *G06T 19/00* (2011.01)

(52) U.S. Cl.
CPC ............. *G06K 9/52* (2013.01); *G06K 9/6201* (2013.01); *G06K 9/6267* (2013.01); *G06T 5/006* (2013.01); *G06T 17/05* (2013.01); *G06T 19/00* (2013.01); *G09B 29/005* (2013.01)

(56) References Cited

U.S. PATENT DOCUMENTS

| | | | |
|---|---|---|---|
| 7,791,616 | B2 | 9/2010 | Ioup et al. |
| 8,139,062 | B2 | 3/2012 | Maupin et al. |
| 8,172,575 | B2 | 5/2012 | Shinozuka |
| 8,342,928 | B1 * | 1/2013 | Teller .................... A63F 13/80 463/42 |
| 8,775,960 | B1 * | 7/2014 | Flores ................... G06Q 10/10 705/4 |
| 9,258,982 | B1 | 2/2016 | Golden |
| 2010/0001997 | A1 | 1/2010 | Kajikawa et al. |
| 2012/0169761 | A1 | 7/2012 | Leah et al. |
| 2014/0043337 | A1 | 2/2014 | Cardno |
| 2016/0196669 | A1 | 7/2016 | Bak et al. |

OTHER PUBLICATIONS

Schreck et al., "Techniques for precision-based visual analysis of projected data", First publ. in: Information Visualization; vol. 9, (2010), No. 3, pp. 181-193.

Jenny, "Adaptive Composite Map Projections", IEEE Transactions on Visualization and Computer Graphics, vol. 18, No. 12, Dec. 2012, pp. 2575-2582.

Jenny et al., "Blending World Map Projections", Proceedings—AutoCarto 2012—Columbus, Ohio, Sep. 16-18, 2012.

Boutoura, "Assigning map projections to portolan maps", e-Perimetron, vol. 1, No. 1, Winter 2006, pp. [40-50].

Eldrandaly, "A COM-based expert system for selecting the suitable map projection in ArcGIS", Expert Systems with Applications, vol. 31, (2006), pp. 94-100.

Strebe, "Map Projection Essentials", http://www.mapthematics.com/Essentials.php, Accessed on Oct. 16, 2014, pp. 1-9.

ArcGIS 10, "What are map projections?", file://C:\Documents and Settings\lisac\Local Settings\Temp\~hhB2DA.htm, accessed on Oct. 4, 2010, pp. 1-155.

Georeference.org, "Guide to Selecting Map Projections", http://www.georeference.org/doc/guide_to_selecting_map_projections.htm, Accessed on Mar. 11, 2014, pp. 1-5.

Mulcahy et al., "Symbolization of Map Projection Distortion: A Review", Cartography and Geographic Information Science, vol. 28, No. 3, 2001, pp. 167-181.

Snyder et al., Excerpts From: "Map Projections a Working Manual", U.S. Geological Survey Professional Paper 1395, US Government Printing Office, Washington, 1987, [Excerpt Produced 2003 at the Naval Postgraduate School].

Big Picture Design, Lesson 1, "Choosing map projections", http://www2.bc.cc.ca.us/cs/cmesel/Carto_Design/lesson1/mod01_les01_top02_3.html, accessed on Nov. 19, 2014.

Google Product Forums, Google Maps Help Forum, "Why does Google maps use the inaccurate, ancient and distorted Mercator Projection?", http://productforums.google.com/forum/#!topic/maps/A2ygEJ5eG-o, accessed on Nov. 19, 2014.

Weisenthal, "Everyone in America Will Want to See This Wind Chill Map Before Heading to Work on Monday", Business Insider, Jan. 5, 2014, http://www.businessinsider.com/what-will-the-wind-chill-be-on-monday-2014-1?utm_source=Pulse&utm_medium=App&utm_campaign=partner&utm_medium=referral&utm_source=pulsenews.

ThinkNook, "4 Ways to Visualize Geographical (Location) Data in Excel 2013", May 31, 2013, http://thinknook.com/4-ways-to-visualize-geographical-location-data-in-excel-2013-2013-05-31/.

"Area", Area Property, http://www.geography.hunter.cuny.edu/~jochen/GTECH361/lectures/lecture04/concepts/Map%20coordinate%20systems/Area%20property.htm, Accessed on Oct. 16, 2014.

Wikipedia, "Behrmann projection", http://en.wikipedia.or/wiki/Behrmann_projection, Accessed on Nov. 18, 2014.

"Choosing a projection", How to choose a projection, http://www.geo.hunter.cuny.edu/~jochen/gtech201/lectures/ec6concepts/map%20coordinate%20systems/how%20to%20choose%20a%20projection.htm, Accessed on Oct. 16, 2014, pp. 1-13.

Chris Webb's BI Blog, "Power Pivot / Power Query Read-Only Connection Problems in Excel 2013—and What to Do About Them", Analysis Services, MDX, PowerPivot, DAX and anything BI_related, Archive for the Excel Category, http://cwebbbi.wordpress.com/category/excel/, Accessed on Nov. 18, 2014, pp. 1-21.

The Erasmus Network, Who is connected with whom?, Where do students go?, "Why Study Abroad?" http://erasmus.ahoi.in/, Accessed on Oct. 16, 2014, pp. 1-6.

GeoBase, "GeoBase Web Mapping Service (WMS)", http://www.geobase.ca/geobase/en/wms/index.html, Accessed on Oct. 16, 2014, pp. 1-5.

Google Maps, "Meet nonprofits using "Geo for Good"", Nov. 12, 2013, http://google-latlong.blogspot.co.il/2013/11/meet-nonprofits-using-geo-for-good.html?utm_source=feedburner&utm_medium=feed&utm_campaign=Feed:+blogspot/SbSV+%28Google+LatLong%29, pp. 1-3.

Office of Surface Mining Reclamation and Enforcement, U.S. Department of the Interior, "Data Miner", United States Universal Transverse Mercator (UTM) Zones, Jul. 8, 2011, http://www.tips.osmre.gov/Geospatial/Data_Miner/usutm.shtml.

Georeference, "Universal Transverse Mercator (UTM)", http://www.georeference.org/doc/universal_transverse_mercator_utm_.htm, Accessed on Oct. 16, 2014, pp. 1-4.

Georeference, "Guide to Selecting Map Projections", http://www.georeference.org/doc/guide_to_selecting_map_projections.htm, Accessed Mar. 11, 2014, pp. 1-5.

Husting, "Husting's CoolBI", Making Data Cool, One Byte at a Time, Apr. 18, 2013, http://husting.com/2013/04/18/if-i-was-a-full-time-data-scientist-this-is-what-i-would-do-excel-geoflow/, Accessed on Nov. 18, 2014, pp. 1-8.

Google Maps, "Mapping the world's deforestation over time", Nov. 14, 2013, http://google-latlong.blogspot.co.il/2013/11/mapping-worlds-deforestation-over-time.html?utm_source=feedburner&utm_medium=feed&utm_campaign=Feed:+blogspot/SbSV+%28Google+LatLong%29, pp. 1-4.

Google Earth, Shared publicly—Nov. 14, 2013, Maps of Global Forest Change, https://plus.google.com/photos/+GoogleEarth/albums/5945835727174665985/5945838776208728226?pid=5945838776208728226&oid=106191537604091348855.

Mapthematics Forums, "Why Mercator for the Web? Isn't the Mercator bad?", Mar. 15, 2012, http://www.mapthematics.com/forums/viewtopic.php?f=8&t=251, pp. 1-6.

Mapthematics Forums, "What is "less distorted"?", Nov. 29, 2011, http://www.mapthematics.com/forums/viewtopic.php?f=8&t=230, pp. 1-3.

Rankin, "Radical Cartography", 2006, http://www.radicalcartography.net/?projectionref.

(56) References Cited

OTHER PUBLICATIONS

The Refugee Project, http://www.therefugeeproject.org/#/2012, Accessed on Oct. 16, 2014, pp. 1-5.
Tissot indicatrices, http://www.geography.hunter.cuny.edu/~jochen/GTECH361/lectures/lecture04/concepts/Map%20coordinate%20systems/Tissot%20indicatrices.htm, Accessed on Oct. 16, 2014, pp. 1-4.
UX.Blog, The user experience, mapping, and data visualization blog of IDV Solutions., "A National Portrait of Drunk Driving", Dec. 27, 2012, http://uxblog.idvsolutions.com/2012/12/a-national-portrait-of-drunk-driving.html.
Mathworks, "Visualizing and Quantifying Projection Distortions", http://www.mathworks.com/help/map/visualizing-and-quantifying-projection-distortions.html, Accessed on Oct. 16, 2014, pp. 1-10.
Wikipedia, "List of Map Projection", http://en.wikipedia.org/wiki/List_of_map_projections, Accessed on Oct. 16, 2014, pp. 1-13.
Wikipedia, "Map Projection", http://en.wikipedia.org/wiki/Map_projection, Accessed on Oct. 16, 2014, pp. 1-16.
Microsoft Research, "Worldwide Telescope Projection Reference", http://www.worldwidetelescope.org/docs/worldwidetelescopeprojectionreference.html, Accessed on Oct. 16, 2014, pp. 1-8.
Dana, "Map Projection Overview", Department of Geography, University of Texas at Austin, 1995, http://www.colorado.edu/geography/gcraft/notes/mapproj/mapproj.html, pp. 1-7.
Wikipedia, the free encyclopedia, "Mercator Projection", https://en.wikipedia.org/wiki/Mercator_projection, pp. 1-13, printed on May 9, 2016.
Pending U.S. Appl. No. 14/924,751, filed Oct. 28, 2015, entitled "Method to Optimize the Visualization of a Map's Projection Based on Data and Tasks", pp. 1-31.
Wikipedia, the free encyclopedia, "Map Extent", https://en.wikipedia.org/wiki/Map_extent, p. 1, printed on May 9, 2016.

\* cited by examiner

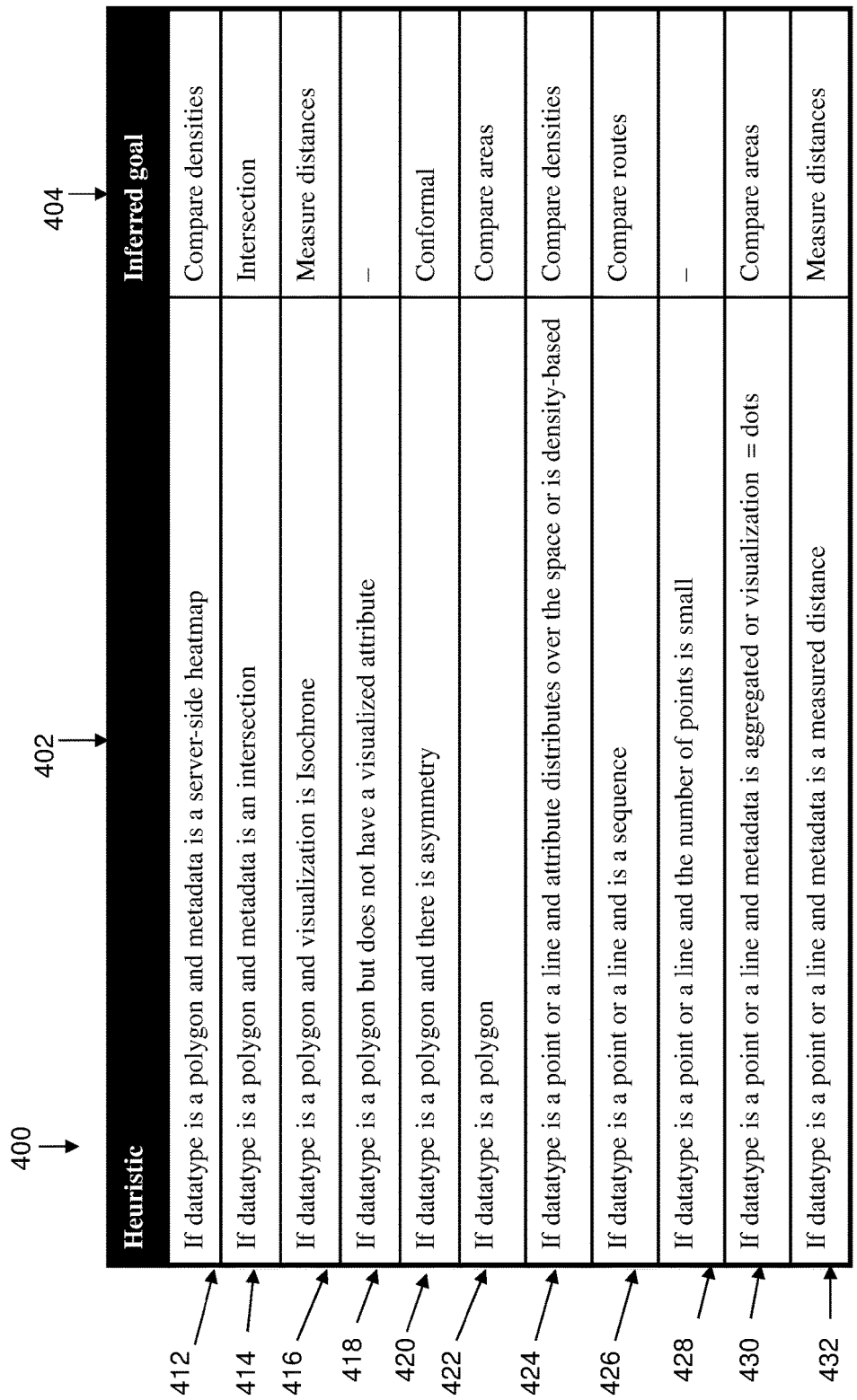

FIG. 5

| Heuristic | Inferred goal |
|---|---|
| If datatype is a polygon and metadata is a server-side heatmap | Compare densities |
| If datatype is a polygon and metadata is an intersection | Intersection |
| If datatype is a polygon and visualization is Isochrone | Measure distances |
| If datatype is a polygon but does not have a visualized attribute | – |
| If datatype is a polygon and there is asymmetry | Conformal |
| If datatype is a polygon | Compare areas |
| If datatype is a point or a line and attribute distributes over the space or is density-based | Compare densities |
| If datatype is a point or a line and is a sequence | Compare routes |
| If datatype is a point or a line and the number of points is small | – |
| If datatype is a point or a line and metadata is aggregated or visualization = dots | Compare areas |
| If datatype is a point or a line and metadata is a measured distance | Measure distances |

| Goal | Area | Distance | Azimuth | Conformal |
|---|---|---|---|---|
| Compare areas | ✓ | | | |
| Show or compare points or glyphs | ✓ | | | |
| Density | ✓ | | | |
| Distribution | ✓ | | | |
| Routing | | ✓ | | |
| Flow | ✓ | | | ✓ |
| Features intersection | | | | ✓ |
| Movement pattern definition | | | | ✓ |
| Outlier detection | Depends on the attribute type | | | |
| Trend detection | Depends on the attribute type | | | |
| Measure distance | | ✓ | | |

…

METHOD TO OPTIMIZE THE VISUALIZATION OF A MAP'S PROJECTION BASED ON DATA AND TASKS

BACKGROUND

Projection of maps inherently includes challenges with displaying the spherical earth in two dimensions. Map projection techniques are designed to show with reasonable accuracy the spherical 3-dimensional earth in two dimensions. Projections cause at least distortions in either angular conformity (direction), distance, or area. A coordinate reference system (CRS) can define, with the help of coordinates, how the two-dimensional projected map is related to real locations on the earth.

SUMMARY

According to an aspect of the invention, a method for generating a map using a computer is based on data and weighted factors to minimize corresponding projection distortions. The method includes determining visualization goals from analyzing a set of datasets for a map using the computer. A set of visualization characteristics are calculated for each dataset based on the visualization goals using the computer. The visualization characteristics are analyzed to weight factors for each of the datasets. Each of the weighted factors is adjusted based on the relevance of each of the datasets for visualization of the map. An aggregate vector of weighted factors is calculated based on all of the datasets, and the map for visualization is generated based on the aggregate vector of weighted factors.

According to another aspect of the invention, a computer program product generates a map based on data and weighted factors to minimize corresponding projection distortions. The computer program product comprises a computer readable storage medium having program instructions embodied therewith, wherein the computer readable storage medium is not a transitory signal per se, and the program instructions are executable by a computer to cause the computer to perform a method. The method includes: determining visualization goals from analyzing a set of datasets for a map using a computer; calculating a set of visualization characteristics for each dataset based on the visualization goals using the computer; analyzing the visualization characteristics to weight factors for each of the datasets; adjusting each of the weighted factors based on relevance of each of the datasets for visualization of the map; calculating an aggregate vector of weighted factors based on all of the datasets; and generating the map for visualization based on the aggregate vector of weighted factors.

According to another aspect of the invention, a method to determine an optimal map projection for a geographical extent includes: accepting a user request for a map for a geographical extent for display using a computer; determining a set of elements that are contained within the geographical extent, using the computer; building a list of shape files for the elements, each shape file being constructed based on a map projection; ranking the shape files by comparing an area of the shape file to a geographical area of the shape file's associated element; re-rank the shape files by comparing a great circle distance between a center of the area of the shape file and a geographical center of the shape file's associated element; re-rank the shape files by comparing azimuth errors for a set of contained points in the shape associated with each of the shape files; and selecting a map projection that minimizes differences in area and distance as compared to the geographical extent.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 5 is a chart illustrating embodiments of datatypes according to the present disclosure;

DETAILED DESCRIPTION

In order to create a map that best fits visualization goals, including a users' needs (for example, to optimize map projections), one can inquire of an expert on GIS or a cartographer, or in some cases, can also apply basic rules. Examples of basic rules: for small scale navigation, using a projection that preserves angular relationships; for measuring distance, using a projection that is designed to preserve distances; and for calculating or comparing areas, using a projection that preserve areas. For example, a Robinson projection is a compromise of projection considerations where distortions of area, angular conformity and distance are acceptable. A Mercator projection, for example, is used where angular relationships are important, but the relationship of areas are distorted.

For a non-expert user, finding the best projection can be a difficult task especially when varied data sources are used and the user tries to find the best projection to reason based on visual insights. The present disclosure can infer the best projection based on the data and the user tasks by analyzing the user tasks to determine no action, one or more attributes to preserve, or a set of weights to the attributes. The method can analyze the map and data spatial characteristics and provide a global factor to the weights, for example, if due to the geography one attribute is preserved, then the attribute can be given more weight than other factors. A projection type can be determined, such as, azimuthal, conic, and cylindrical, and configuration data can be determined. The above analysis can be done for several datasets, and the results can be summed. A projection can then be determined that minimizes the overall distortion resulting in the best projection available.

Map visualization is commonly used, for example, on a vehicle navigation system, on a sales report for an area, or a hand held device. Many map projections have different resolution (e.g., worldwide, nation wide). However, a typical user has neither the GIS skills nor the awareness of distortions that can occur when projecting a map. The present disclosure can, for example, automate the map projection process and suggest the best projection given user data and goals/tasks of the user.

A best projection or optimum display, for instance, having the least distortion for a map projection. The present disclosure considers the geography and the data to generate an optimum map projection for the purposes of the user. The present disclosure can help a user to find a projection that has less conceptual and perception bias regardless of minor accuracy problems that may be relevant to a geographic or GIS (Geographic Information Systems) expert.

Figure 1:
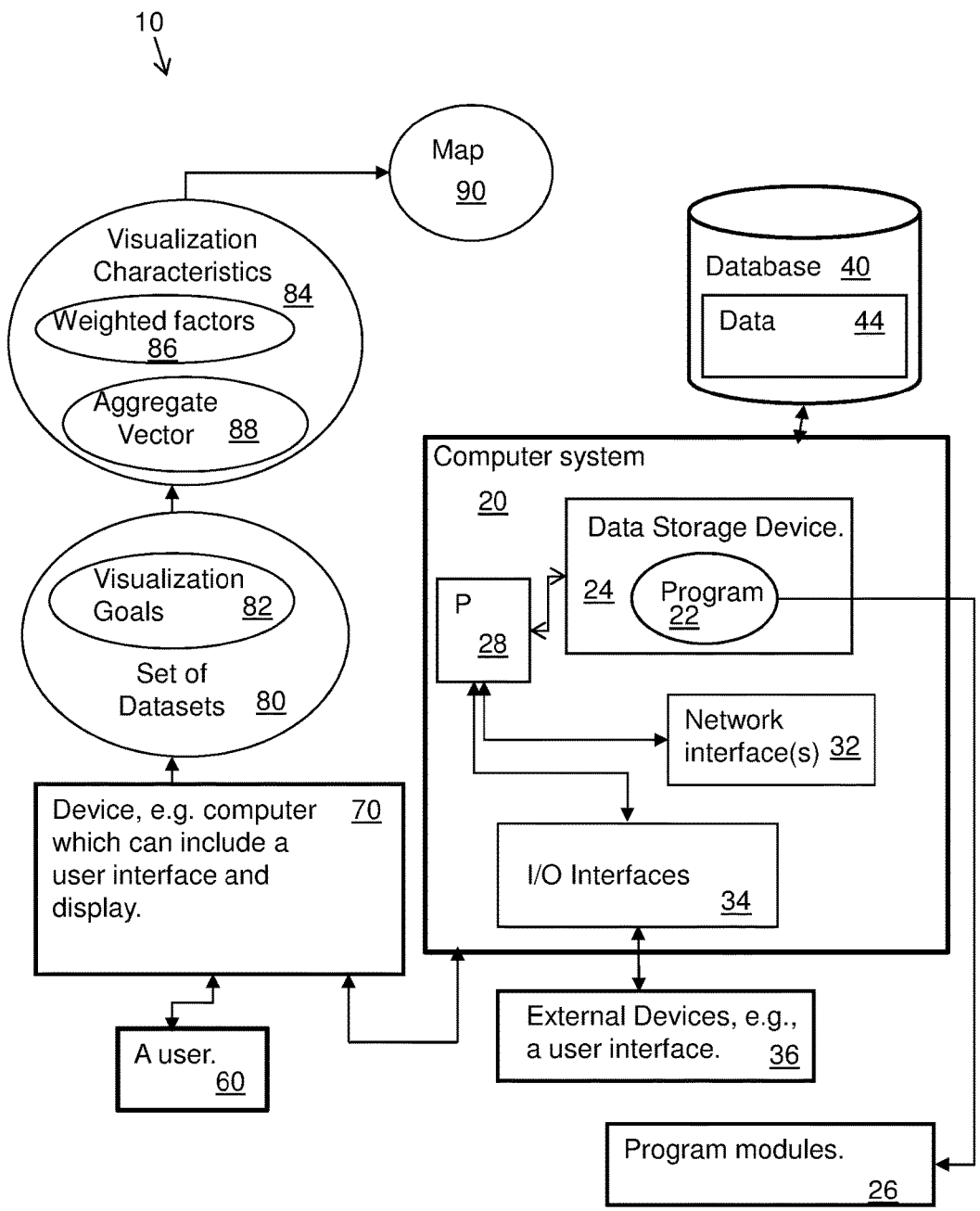
FIG. 1 is a schematic block diagram illustrating an overview of a system and methodology to generate a map based on data and weighted factors to minimize corresponding projection distortions.
Figure 2:
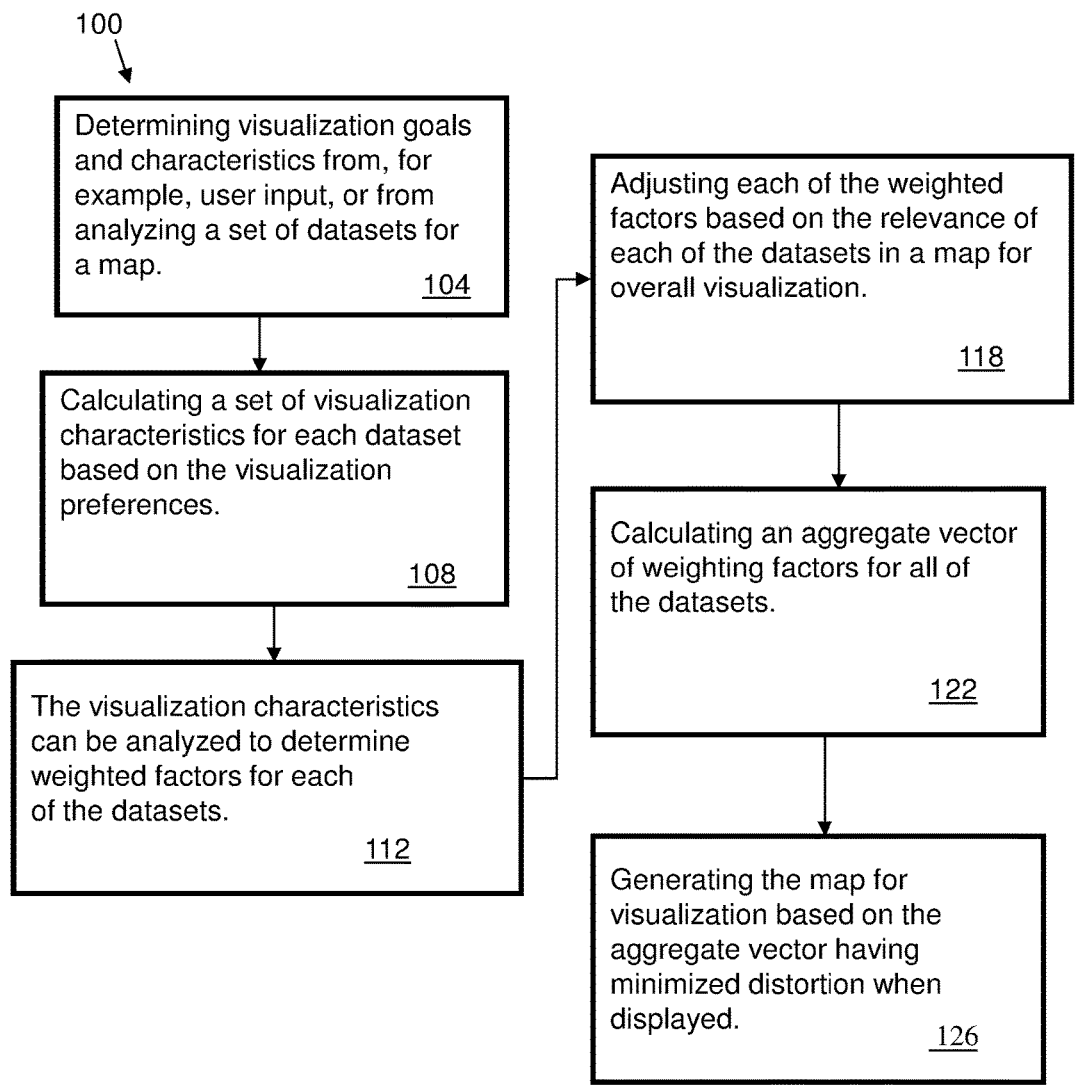
FIG. 2 is a flow chart illustrating a method for generating a map based on data and weighted factors to minimize corresponding projection distortions.

Referring to FIGS. 1 and 2, a high level discussion of the present disclosure includes, for example, a system 10 and a method 100 to determine an optimal map projection for a user's 60 goals and\or has the overall minimal distortion on a device for a geographical extent or area. The method 100 can generate a map based on data and weighted factors 86 to minimize corresponding overall projection distortions and\or distortions based on the users' visualization goals. The method 100 can determine visualization goals (e.g., user goals) and characteristics from, for example, user input, or from analyzing a set of datasets for a map, as in block 104 of FIG. 2. The visualization goals or characteristics 84 can also be a compilation of analyzed data and user inputted data or visualization preferences (e.g., responses to a series of questions) by a user requesting a map for a geographical extent or area. For instance, the user can specify a weight for a list of projection distortions based on the importance of minimizing the distortion to the user.

The map 90 can be generated by a device 70 which can be embodied or connected to a computer system 20 for generating the map based on data and weighted factors to minimize corresponding projection distortions. A map can contain a base\background layer of predefined rasters\tiles images that describe the landscape and\or any others layers of information. The device 70 can be, for example, a computer, a mobile device, Personal Data Assistant (PDA), notebook, a tablet, a cell phone, or other mobile device, a laptop, a netbook, or a car communication system.

A set of visualization characteristics 84 can be calculated for each dataset 80 based on the visualization goals 82, as in block 108. The visualization characteristics can be analyzed to determine weighted factors 86 for each of the datasets, as in block 112.

In one example, the method can determine a set of elements that are contained within a geographical extent. A list of shape files can be built for these elements, wherein each shape file is constructed based on a map projection. A shape file can be a mapped multisided geometric polygon that has been transformed from spherical representation to a two dimensional projection. The shape files can be ranked by comparing the projected area of the shape file to the actual geographical area of the shape file's associated element. For example, the shape file elements can be visually compared by their areas when rendered on the map with minimal bias in the area size.

In one example, the shape files can be ranked by comparing the great circle distance between the center of the shape area and the geographical center of the shape file's associated element, thereby selecting the shape file that minimize the distance distortion. In another example, the shape files can be ranked by comparing the azimuth (compass bearing) and the geographical azimuth for a set of points.

Adjusting the weight of the factors to reflect the relevance of each of the datasets in a map for overall visualization, as in block 118.

Calculating an aggregate vector 88 of weighted factors for all the datasets, as in block 122.

Generating the map for visualization based on the aggregated vector having minimized distortion when displayed, as in block 126.

An optimized map, that is, one having minimal distortion, can result from selecting the map projection that minimizes the differences in area, differences in distance, and differences in azimuth between the various projections and geographical measures in accordance with the aggregate vector of weighted factors. The method 100 is one embodiment in accordance with the present disclosure, other embodiments of the disclosure can be implemented. In one example, the computer system can be part of a service for providing the method disclosed herein as a service. The method 100 may be embodied in a program 22 embodied on a computer readable storage device, e.g., data storage device 24, which is executable by a processor 28 of the computer 20 (i.e., execute program steps, code, or program code). Additional data storage may also be embodied as a database 40 including data 44. The program or executable instructions therefrom, may be offered as a service by a provider. The program may also be stored and run locally on a user device. The computer 20 and program 22 shown in FIG. 1 are generic representations of a computer and program that may be local to a user, or provided as a remote service, such as a website accessible using the Internet. It is understood that the computer 20 also generically represent herein a computer device such a personal data assistant, a laptop, or desktop computer, etc., or part of one or more servers, alone or as part of a datacenter. The computer system 20 can include a network interface 32, and input/output (I/O) interface(s) 34. The I/O interface 34 allows for input and output of data with an external device 36 that may be connected to the computing device. The network interface 32 may provide communications between the computing device and a computer network. The method steps and system features may be embodied in modules of the program 22 for performing the tasks of each of the steps of the method and system, which are generically represented in FIG. 1 as program modules 26. The program 22 and program modules 26 can execute specific steps, routines, sub-routines, instructions or code, of the program.

Different projections can adversely effect a map mainly in a global scope where data is visualized across several latitudes (i.e., parallels).

According to an embodiment of the present disclosure, a method for generating a map uses a computer and can include generating a base map (raster data)\tiles and\or the projected data. For example, the data can be projected to look like a circle and not ellipsoid. The generated map is based on data and weighted factors to minimize corresponding projection distortions. More specifically, referring to FIG. 3, the present disclosure optimizes a map projection as discussed below. The method 100 includes determining the user goal and deriving the visualization goals and weighted factors (block 104-112). One way of weighting factors is to accept a user request (block 204 of method 200 (FIG. 3)) for a map for a geographical extent, wherein the user request can optionally include a weight for each projection distortion (block 208 of method 200 (FIG. 3)). The weight can specify the importance of minimizing the distortion to the user. A set of elements can be determined that are contained within the geographical extent. A list of shape files for the set of elements can include each shape file being constructed based on a map projection. The shape files can be ranked by comparing the area of the shape file to the geographical area of the shape file's associated element. The shape files can also be ranked by comparing the great circle distance between the center of the shape area and the geographical center of the shape file's associated element. The shape files can further be ranked by comparing the azimuth (compass bearing) and the geographical azimuth for a set of points in the shape files. A map projection can be selected that minimizes the differences in area, differences in distance and differences in azimuth between the various projections and geographical measures, in accordance with the weighted factors.

Figures 3, 4:
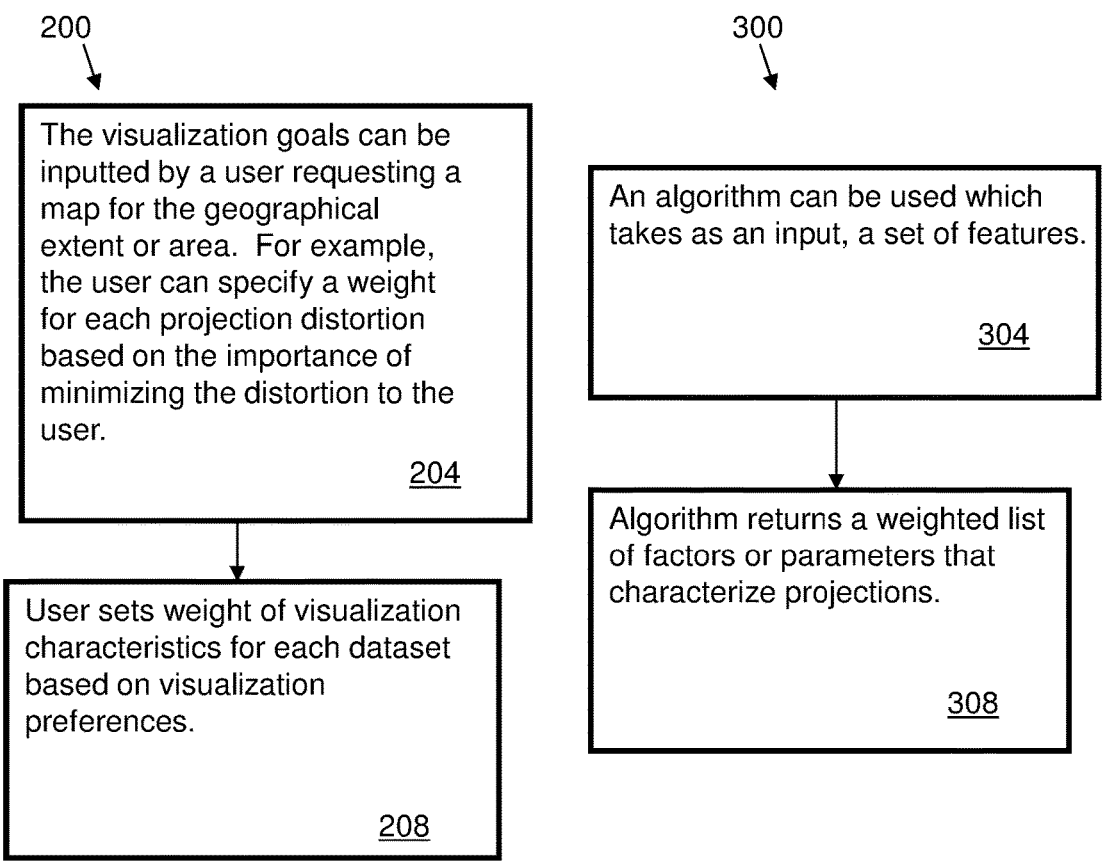
FIG. 3 is a flow chart illustrating an alternative method following from the method shown in FIG. 2.
FIG. 4 is a flow chart illustrating another alternative method following from the method shown in FIG. 2.

Referring to FIG. 4, in another embodiment 300, an algorithm can be used which takes as an input of a set of features (described below), and returns a weighted list of parameters that characterize projections (blocks 304 and 308) (and generally referred to in blocks 104-112 of the method 100). The set of features can include a definition of scope, for example, a map scope, which can be bounding box, center point, and\or a zoom level. Another scope can be a data scope. A bounding box can be represented with two or more points, for example, a central point or center of mass, and an overall data orientation (e.g., south to north, west to east, etc.). In one instance the points can be origin and destination.

Another feature can be defined as a tool usage, which can include a list of actions that the user performed. For example, the list of actions can be a simple list or an aggregate list of steps. A usage type is one way to characterize a user's actions. For example, navigate, compare areas\routes\points, measure area\route, are common semantics or terms for users actions.

Another feature can be defined as a geometry type. For example, a point, a line and a polygon can be a list of item or an aggregated list (e.g., 90% polygons and 10% points).

Another feature can be defined as a data type which can contain semantic metadata such as area size, or earning per square mile, or non-sematic data such as income.

Another feature can be defined as a visualization type, which may include simple features, or density based features (such as heatamp), glyphs\icons, or aggregated visualization.

Another feature can be defined as base map content, for example, an urban area, or the high sea.

When a user does not know which attribute to preserve and/or is not directly providing map goals or attributes, the method of the present disclosure can infer a user's goal for the map based on data. In one embodiment a user can select task(s) from a list and\or rank the tasks. Each task can refer to an attribute to preserve. The method can generate a weight for each attribute, for example: navigate, calculate distance, compare areas. In another embodiment, the method can infer a user's goal using raw data including metadata, and considering task of the user to infer which attributes of a map to preserver or weight. For example, data (e.g., metadata) can be used to infer a user's goals and can include: area comparison which can relate to an interest in preserving an area; density and distribution which can relate to an area of interest; and routing inquiries can relate to conformal and distance matters.

Referring to FIG. 5, in one embodiment, a data chart 400 of one or more datasets can include user task data. A plurality of heuristics 402 can be used to determine a goal or task or inferred goal 404 of the user. If the datatype is considered a polygon and metadata is directed to a server-side heatmap, the inferred goal is to compare densities 412. If the datatype is considered a polygon and the metadata is directed to an intersection, then the inferred goal is an intersection 414. If the datatype is considered a polygon and a visualization is an isochrone (an isochrone map or isochrone can show related areas where lines on a map connecting points can have equal travel times), then the inferred goal is to measure distances 416. If the datatype is considered a polygon but does not have a visualized attribute, then there is no inferred goal 418. If the datatype is considered a polygon and there is symmetry, the inferred goal is conformal 420. If the datatype is considered a polygon, then the inferred goal is to compare areas 422. If the datatype is considered a point or a line and attributes distribute over the space or are density based, then the inferred goal is to compare densities 424. If the datatype is considered a point or line and is a sequence, then the inferred goal is to compare routes 426. If the datatype is considered a point or line and the number of points are small, then the goal 428 cannot be inferred. If the datatype is considered a point or line and metadata is aggregated or a visualization includes dots, then the inferred goal is to compare areas 430. If the datatype is considered a point or a line and the metadata includes measuring distance, then the inferred goal is to measure distances 432.

Figure 6:
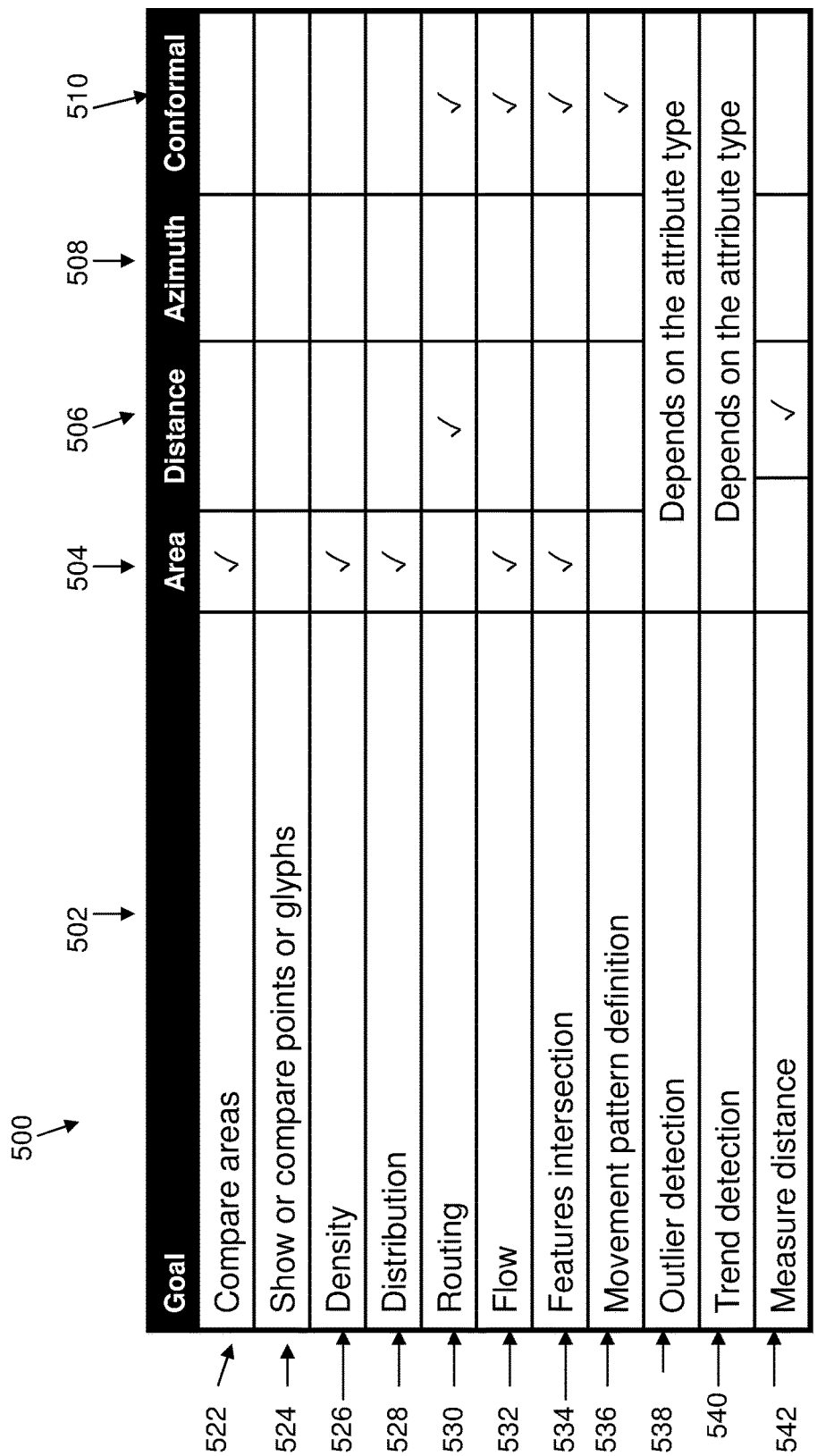
FIG. 6 is a chart illustrating embodiments of goals according to the present disclosure.

Referring to FIG. 6, in one embodiment the present disclosure, a chart 500 can be used to determine which attribute of a map to preserve. The map projection may not accurately preserve all attributes, but rather weight some attributes over others to render a compromise map projection that conveys the information best or optimally to the user. The weighting can be set for user tasks and average data characteristics based on: 1. dataset visibility (e.g., data being shown all the time, as opposed to data shown upon interaction(s)) and the order of visualizing the datasets; 2. the amount of relevant data for each dataset in the visualized bounding box; and 3. attempting to minimize overall distortion.

The goals 502 can relate to an attribute, for example, an area 504, distance 506, azimuth 508, and a conformal map 510. If the goal is to compare areas, then the attribute to preserve is area as shown in row 522. If the goal is to show or compare points or glyphs, then there is no attribute to preserve over another 524. If the goal is to analyze\show density in a map, then the attribute to preserve is area as in row 526. If the goal is to analyze distribution, then the attribute to preserve is area as in row 528. If the goal is routing, then the attributes to preserve are distance and conformal as in row 530. If the goal is understanding the flow, then the attributes to preserve are area and conformal as in row 532. If the goal is features intersection, then the attributes to preserve are area and conformal as in row 534. When the goal is movement pattern definition, the attributes to preserve is conformal as shown in row 536. If the goal is outlier detection, or trend detection, then the attribute to preserve depends on the attribute type as shown in rows 538, 540. When the goal is to measure distance, then the attribute to preserve is distance as shown in row 542.

Figure 7:
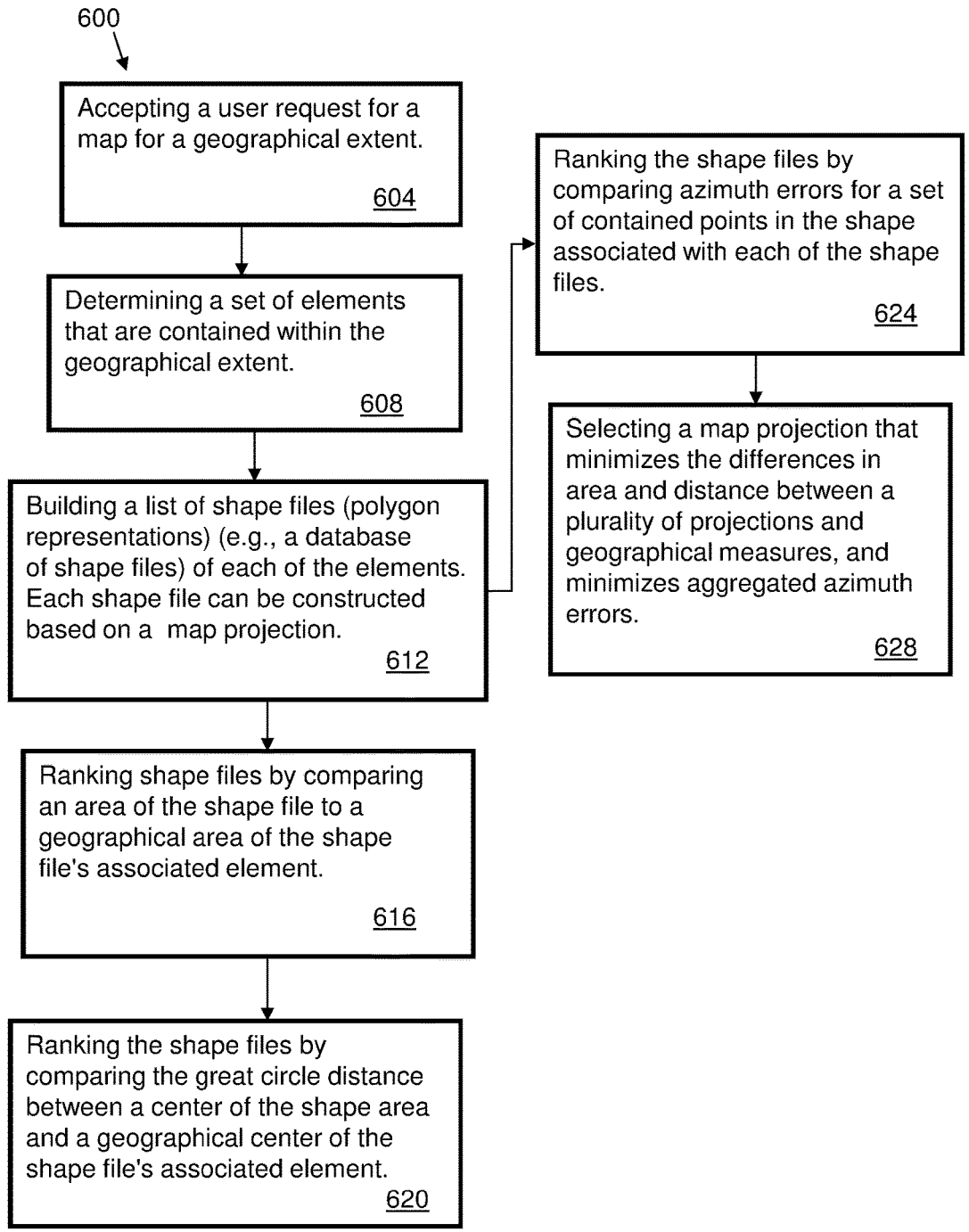
FIG. 7 is a flow chart illustrating another embodiment of a method according to the present disclosure.

An alternative embodiment of a method 600 according to the present disclosure for determining an optimal map projection for a geographical extent is discussed below with reference to FIG. 7. The method 600 includes accepting a user request for a map for a geographical extent, as in block 604. The request may include showing a map at an arbitrary zoom extent, which may include a request to show a map for the first time, or a pan/zoom action on an existing map.

A set of elements are determined which are contained within the geographical extent, as in block 608. A database can be assembled that includes data of the elements such as known place names for areas, for example, generating a table of names of countries, states, or other geographical areas of interest. The database can include latitude and longitude of the geographic center for each area item and the overall area based on spherical (real) measure for each item, in common units, such as, nautical miles squared.

A list of shape files can be built, for example, by assembling a database of shape files (polygon representations) of each element, as in block 612. A database of shape files (polygon representations) of each of the elements can be assembled. The data can include names, projection types and area inside the polygon based on the projection, in common units, such as, nautical miles squared. Each shape file can be constructed based on a map projection. The shape file can include a name, projection type and azimuth (compass) errors for predetermined number points in the projected shape file, which can be expressed as a deviation error or another suitable measure. A database of base maps using different projections that allow zooming from full earth to any arbitrary zoom extent can also be assembled. Place names can be determined that will be visible in the geographical extent. Optionally, shapes can be found for all elements that are fully visible in the geographical extent. Further, geospatial queries can be used to find elements which are contained in polygons defined by the viewing/zoom extent.

Shape files can be collected for each of the place names needed for the user requested geographical extent. A core and rank shape file elements can be calculated based on the closeness of the projection polygon area to the real area size. A score can be calculated for the actual great circle distance between the geographic center of the elements for the known place names. A distance can be calculated between a geographic center of the shape files and the actual distance of the shape file's associated element. The shape files can be ranked by comparing an area of the shape file to the geographical area of the shape file's associated element, as in block 616. The shape files can be ranked or re-ranked by their closeness to the projected actual distances, as in block 620.

A score can be calculated for the azimuth (compass) variance between actual map coordinates and equivalent projected points. The shape files can be ranked or re-ranked by comparing azimuth errors for a set of contained points in the shape associated with each of the shape files, as in block 624.

An optimal projection can be used for the geographical extent requested by the user, based on a map projection that minimizes differences in area and distance between a plurality of projections and geographical measures, and minimizes aggregated azimuth errors, as in block 628. The optimal projection can be determined as the projection associated with the best aggregate score from ranking the shape files as in blocks 616-624. Weighting can optionally be applied to scores to favor one attribute over others in a given application. For example, azimuth scores may be weighted higher than areas scores in a navigation application.

Referring to FIG. 1, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The embodiments, features, and instructive examples described above are illustrative, and should not be construed to limit the present disclosure to the particular embodiments or enumerated examples. Thus, various changes and modifications may be effected by one skilled in the art without departing from the spirit or scope of the disclosure as defined in the appended claims.

What is claimed is:

1. A system for determining and generating an optimal map projection for a geographical extent, the system comprising:
a computer system comprising: one or more computer processors, one or more computer-readable storage media, and program instructions stored on one or more of the computer-readable
storage media for execution by at least one of the one or more processors, the program instructions, comprising:
accepting a user request for a map for a geographical extent for display using a computer;
determining a set of elements that are contained within the geographical extent, using the computer;
building a list of shape files for the elements, each shape file being constructed based on a map projection;
ranking the shape files by comparing an area of the shape file to a geographical area of the shape file's associated element;
re-rank the shape files by comparing a great circle distance between a center of the area of the shape file and a geographical center of the shape file's associated element;
re-rank the shape files by comparing azimuth errors for a set of contained points in the shape associated with each of the shape files; and
selecting a map projection that minimizes differences in area and distance as compared to the geographical extent.

2. The system of claim 1, further comprising:
selecting the map projection that minimizes differences in area and distance between a plurality of projections and geographical measures, and minimizes aggregated azimuth errors.

3. A system to generate a map based on data and weighted factors to minimize corresponding projection distortions, the system comprising:
a computer system comprising: one or more computer processors, one or more computer-readable storage media, and program instructions stored on one or more of the computer-readable storage media for execution by at least one of the one or more processors, the program instructions, comprising:
determining visualization goals from analyzing a set of datasets for a map using a computer;
calculating a set of visualization characteristics for each dataset based on the visualization goals using the computer, wherein the calculating of a set of visualization characteristics includes determining elements contained within a geographical extent;
analyzing the visualization characteristics to weight factors for each of the datasets;
adjusting each of the weighted factors based on relevance of each of the datasets for visualization of the map;
calculating an aggregate vector of weighted factors based on all of the datasets;
generating the map for visualization based on the aggregate vector of weighted factors;
building a list of shape files for each of the elements, each shape file being constructed based on a map projection, wherein the weighted factors consider the shape files of each of the elements;
ranking the shape files by: comparing an area of the shape file to a geographical area of the element associated with the shape file; comparing a great circle distance between the center of the shape area and the geographical center of the shape file's associated element; and comparing azimuth errors for a set of contained points in a shape associated with each of the shape files; and selecting a map projection that minimizes the differences in area and in distance between a plurality of projections and geographical measures, and minimizes aggregated azimuth errors.

4. The system of claim 3, wherein the datasets include metadata describing the datasets.

5. The system of claim 3, wherein the visualization characteristics include data which includes bounding box, center point, center of mass, and data orientation.

6. The system of claim 3, wherein each of the visualization goals is associated with one of the datasets.

7. The system of claim 3, further comprising:
weighting the datasets which are always visible in the map more than the datasets that are only shown upon interactions.

8. The system of claim 3, further comprising:
weighting the datasets which relate to visualization more than other datasets.

9. The system of claim 3, further comprising:
weighting datasets which have datapoints in a visualization bounding box.

10. The system of claim 3, wherein the datasets include visualization preferences from a user.

* * * * *